US006827664B2

(12) United States Patent
Stevenson et al.

(10) Patent No.: US 6,827,664 B2
(45) Date of Patent: Dec. 7, 2004

(54) TRANSMISSION

(75) Inventors: Paul D. Stevenson, Ann Arbor, MI (US); James B. Borgerson, Ann Arbor, MI (US); Joel M. Maguire, Northville, MI (US); Kent H. Kienzle, Ann Arbor, MI (US); Donald L. Dusenberry, Farmington Hills, MI (US); Jeffrey J. Biallas, Dexter, MI (US); Clinton E. Carey, Monroe, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/295,120

(22) Filed: Nov. 15, 2002

(65) Prior Publication Data

US 2003/0119623 A1 Jun. 26, 2003

Related U.S. Application Data

(60) Provisional application No. 60/336,126, filed on Nov. 15, 2001.

(51) Int. Cl.$^7$ ................................................. F16H 3/62
(52) U.S. Cl. ..................... 475/275; 475/276; 475/278; 475/281; 475/292
(58) Field of Search ................................ 475/275, 276, 475/278, 281, 292

(56) References Cited

U.S. PATENT DOCUMENTS

| | | | |
|---|---|---|---|
| 3,300,002 A | 1/1967 | Roper | |
| 4,076,108 A | 2/1978 | Fogelberg | |
| 4,361,216 A | 11/1982 | Overbeek | |
| 4,620,621 A | 11/1986 | Kulczycki et al. | |
| 4,660,439 A | * 4/1987 | Hiraiwa | ..................... 475/276 |
| 5,106,352 A | 4/1992 | Lepelletier | |
| 5,234,389 A | 8/1993 | Goates | |
| 5,836,849 A | 11/1998 | Mathiak et al. | |
| 5,971,123 A | 10/1999 | Ochab et al. | |
| 6,042,498 A | 3/2000 | Kashiwase | |
| 6,059,682 A | 5/2000 | Friedmann et al. | |
| 6,071,208 A | 6/2000 | Koivunen | |
| 6,110,069 A | 8/2000 | Taniguchi et al. | |
| 6,120,410 A | 9/2000 | Taniguchi et al. | |
| 6,135,912 A | 10/2000 | Tsukamoto et al. | |
| 6,139,463 A | * 10/2000 | Kasuya et al. | ............... 475/275 |
| 6,176,802 B1 | 1/2001 | Kasuya et al. | |
| 6,217,479 B1 | 4/2001 | Brown et al. | |

(List continued on next page.)

FOREIGN PATENT DOCUMENTS

| | | | | |
|---|---|---|---|---|
| JP | 02107851 A | * | 4/1990 | ............. F16H/3/66 |
| WO | WO 01/04513 A1 | | 1/2001 | |

OTHER PUBLICATIONS

Ford Model T Transmission sketch believed to be published before Nov. 15, 2001.
Transmission schematics believed to be published before Nov. 15, 2001.
1992 FLC Transverse Transaxle Assembly believed to be published before Nov. 15, 2001.

*Primary Examiner*—Rodney H. Bonck
*Assistant Examiner*—David D. Le
(74) *Attorney, Agent, or Firm*—Leslie C. Hodges

(57) ABSTRACT

A powertrain includes a power transmission having an input shaft continuously connected directly between an engine and a planetary gear member of a first planetary gearset. Another member of the planetary gearset is selectively grounded by a torque transmitting mechanism to establish a reaction member during the launch of a vehicle incorporating the powertrain. The reaction member is established during both the lowest forward drive ratio and the reverse drive ratio. A third member of the planetary gearset transmits the torque from the input shaft, as modified by the planetary gearset, to other planetary gearsets in down stream power flow arrangement with the first planetary gearset.

21 Claims, 14 Drawing Sheets

U.S. PATENT DOCUMENTS

| | | |
|---|---|---|
| 6,244,402 B1 | 6/2001 | Domian et al. |
| 6,299,565 B1 | 10/2001 | Jain et al. |
| 6,361,468 B1 * | 3/2002 | Kato et al. .................. 475/344 |
| 6,471,616 B2 * | 10/2002 | Stevenson .................. 475/296 |
| 6,550,594 B1 | 4/2003 | Peura |
| 6,558,287 B2 * | 5/2003 | Hayabuchi et al. ......... 475/271 |
| 6,663,526 B2 * | 12/2003 | Janson ........................ 475/92 |
| 2002/0033313 A1 | 3/2002 | Kato |
| 2002/0033314 A1 | 3/2002 | Katou et al. |

* cited by examiner

| GEAR | CLUTCH 30 | CLUTCH 32 | CLUTCH 34 | BRAKE 38 | BRAKE 90 |
|------|-----------|-----------|-----------|----------|----------|
| R    |           | X         |           | G        |          |
| N    |           |           |           |          |          |
| 1ST  | X         |           |           | G        |          |
| 2ND  | X         |           |           |          | X        |
| 3RD  | X         | X         |           |          |          |
| 4th  | X         |           | X         |          |          |
| 5th  |           | X         | X         |          |          |
| 6th  |           |           | X         |          | X        |

FIG 3

| GEAR | RATIO | CLUTCH 30 | OWC 80 | 40 | 32 | 34 | 38' |
|---|---|---|---|---|---|---|---|
| R | 2.995 | | | | G | | X |
| N | | | | | | | |
| 1st | 3.969 | G | X | | | | |
| 2nd | 2.366 | X | | X | | | |
| 3rd | 1.541 | X | | | X | | |
| 4th | 1.158 | X | | | | | X |
| 5th | 0.847 | | | | X | X | |
| 6th | 0.660 | | | X | | X | |

OVERALL RATIO 6.18

RING/SUN RATIOS
44/42 = 2.58
60/58 = 1.94
70/68 = 1.85

PINION/SUN RATIOS
50/42 = 0.73
52/42 = 0.65
62/58 = 0.49
72/68 = 0.42

FIG 6

| GEAR | MECHANISM 230 | mechanism 232 | mechanism 234 | mechanism 236 | mechanism 238 | mechanism 240 |
|------|---|---|---|---|---|---|
| R | X | | | X | | |
| N | | | | | | |
| 1 | | | | | X | X |
| 2 | | | X | | X | |
| 3 | X | | | | X | |
| 4 | | X | | | X | |
| 5 | X | X | | | | |
| 6 | | X | X | | | |

FIG 11

TRANSMISSION

CROSS-REFERENCE TO RELATED APPLICATIONS

This application claims the benefit of U.S. Provisional Application Ser. No. 60/336,126, filed Nov. 15, 2001 and incorporates by reference the entire disclosure thereof.

FIELD OF THE INVENTION

This invention relates to automatic shifting power transmissions and more particularly to power transmissions having a single torque transmitter operable to be selectively actuated to launch both forward and reverse drives.

BACKGROUND OF THE INVENTION

In automatic shifting power transmissions it is common practice to install a hydrodynamic fluid drive, such as a torque converter, between the power source (engine) and a multi-speed gear configuration, such as a planetary gear arrangement. The torque converter provides a torque multiplier between the engine and the gearing to improve the vehicle launch performance. The torque ratio of the torque converter is generally in the range of 1.60 to 3.3 depending on the particular application. As is well-known, the torque converter is a slipping device that has a high efficiency loss at vehicle launch. This loss decreases, but continues, as the torque converter approaches a 1.0 to 1.0 speed ratio at high speed and low torque. In recent times, a torque converter lock-up has been added to most transmissions to effectively remove the torque converter from the power path and thereby improve the overall efficiency of the transmission.

Other considerations have been given to improving the overall efficiency of the transmission. Specifically, newer automatic transmissions, with their higher number of gear ratios and higher overall ratio, have less need for torque converter multiplication. This reduced need for torque multiplication has lead to the use of a "friction launch" device in place of a torque converter within stepped gear automatic transmissions. For example, the use of a starting clutch in lieu of the torque converter has been proposed. The advent of electronic controls improves the operation of a starting clutch as a vehicle launch device. The starting clutch is, however, a rotating torque transmitting device which must still deal with all of the complexities associated with such a vehicle launch device. Thus, the control needs considerable accuracy to insure consistent fill times, and to compensate for variable fluid leaks at the rotating shaft seals. This requires accurate hydraulic flow volumes and pressure control over a wide range of operating requirements. Also the use of a starting clutch merely replaces one rotating mechanism with another, albeit a more efficient mechanism. There is only slight axial space saving and perhaps more complex control features.

As noted, if friction launch is applied to a conventional automatic transmission, the starting clutch must fulfill the same requirements as the torque converter. These requirements include, for example, shift and launch quality, NVH and driveline isolation, mass, peak acceleration, and durability. Many of these and other requirements apply to both forward and reverse launches.

The most common implementation of friction launch is simply to locate the starting clutch between the engine and the input to the transmission. This implementation has been used in production with manual transmissions, automated manual transmissions, and continuously variable transmissions. One advantage of using a stand-alone starting clutch assembly is that it can be designed as a drop-in replacement for the torque converter of an existing automatic transmission. Stand-alone starting clutches also have the ability to isolate the transmission from torsional engine inputs, which is an advantage compared to other embodiments which locate the starting clutch further downstream in the powerflow. Another advantage is that the starting clutch can be designed for a lower torque capacity than some of the other implementations. Another variation of a dedicated launch is to locate the launch clutch on the output of the transmission. One of the benefits of an output clutch is the ability to use the clutch as a "fuse" between the transmission and road inputs, thus allowing the clutch to slip at certain load levels and protect the remainder of the transmission.

When applying friction launch to a stepped gear automatic transmission, greater benefits in cost, mass, and packaging can be achieved if an existing clutch can be re-used as the launch clutch. Preferably, the powerflow will allow the same input clutch to be used for both forward and reverse launches. Greater benefits in cost, mass, and packaging can be achieved if the same clutch can be used for both forward and reverse launches.

Another way to apply friction launch to a stepped gear automatic transmission would be to re-use one or more existing reaction clutches for launch. The use of a reaction clutch offers possible cooling advantages and eliminates the need for centrifugal compensation compared to a rotating clutch. Again, the greatest benefits can be achieved if the same reaction clutch can be used for both forward and reverse launch. It is also possible to re-use a combination of an existing input clutch and an existing reaction clutch for forward and reverse launch. One example of such an automatic transmission is disclosed in commonly-owned U.S. Pat. No. 6,471,616.

SUMMARY OF THE INVENTION

It is an object of the present invention to provide a power transmission with an improved friction launch mechanism.

In one aspect of the present invention, a selectively operable torque transmitting mechanism is engaged to initiate both forward and reverse operation in a power transmission. Another aspect of the present invention, the torque transmitting mechanism controls the torque transmitting operation of one planetary gear member of a ratio planetary gearset in a multi-speed power transmission.

BRIEF DESCRIPTION OF THE DRAWINGS

FIG. 3 is a truth table chart describing the engagement pattern for the torque transmitting mechanisms associated with the power transmission shown in FIG. 1;

FIG. 6 is a chart describing the gear ratios and torque transmitting mechanism engagement schedule for planetary gear arrangement shown in FIG. 4;

FIG. 11 is a chart describing the engagement schedule for the torque transmitting mechanisms associated with the planetary gear arrangement shown in FIG. 9;

DETAILED DESCRIPTION OF THE INVENTION

Figure 1:
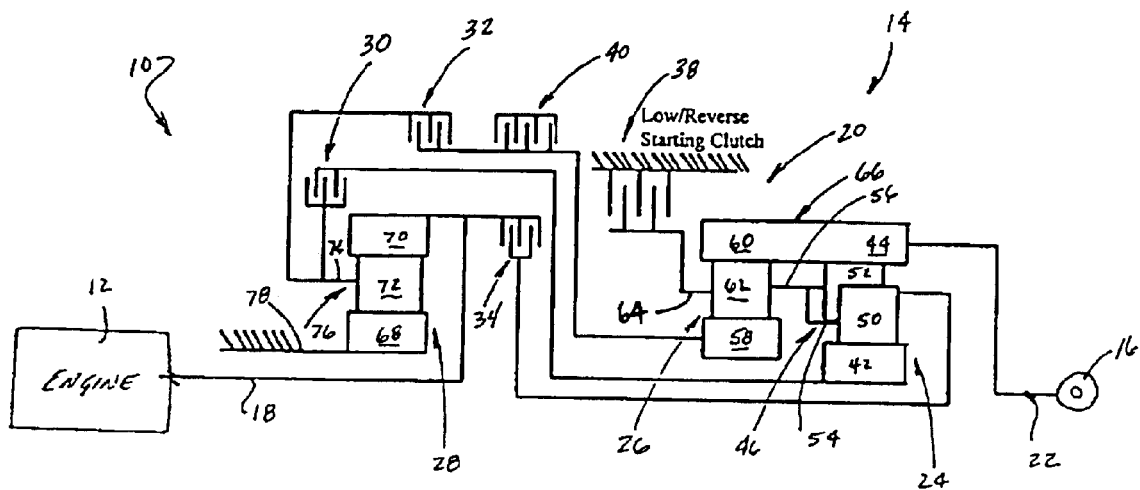
FIG. 1 is a schematic representation of a multi-speed planetary gear arrangement in a power transmission incorporating the present invention.

A powertrain 10 has a power source, such as a conventional internal combustion engine 12, a multi-speed planetary transmission 14, and a conventional final drive mechanism 16. Planetary transmission 14 includes an input shaft 18 connected directly with engine 12, a multi-speed planetary gear arrangement 20, and an output shaft 22 connected directly with final drive mechanism 16. Planetary gear arrangement 20 includes a compound planetary gearset 24, two simple planetary gearsets 26 and 28, three selectively engageable rotating torque transmitting mechanisms 30, 32 and 34 and two selectively engageable stationary torque transmitting mechanisms 38 and 40.

The rotating torque transmitting mechanisms 30, 32 and 34 are conventional fluid-operated multi-plate clutch assemblies, the construction of which is well-known in the art of power transmissions. Likewise, the stationary torque transmitting mechanisms 38 and 40 are conventional fluid-operated brake assemblies of either friction plate type or band plate type. The torque transmitting mechanisms are controlled in engaged and disengaged states by a conventional electro-hydraulic mechanism, not shown, which includes a hydraulic valving arrangement and an electronic control unit (ECU) that incorporates a conventional programmable digital computer. The torque transmitting mechanisms are engaged and disengaged in accordance with performance and operating signals such as, for example, engine speed, vehicle speed, and engine torque to name a few. Those familiar with the art of transmission control will be familiar with the many features and functions that are available with electronic controls.

Referring to FIG. 1 of the drawings, first planetary gearset 24 is shown to include a sun gear 42, a ring gear 44, and a planet carrier assembly 46. Meshed pairs of pinion gears 50 and 52 are rotatably supported on pinion shafts 54 and 56, respectively, that extend between laterally-spaced carrier segments of carrier assembly 46. Pinion gears 50 mesh with sun gear 42 while pinion gears 52 mesh with ring gear 44.

Second planetary gearset 26 includes a sun gear 58, a ring gear 60, and a plurality of pinion gears 62 that are meshed with both sun gear 58 and ring gear 60. As seen, pinion gears 62 are rotatably supported on pinion shafts 64 that also extend between the laterally-spaced carrier segments of carrier assembly 46. Thus, carrier assembly 46 is common to both first planetary gearset 24 and second planetary gearset 26. A ring gear assembly 66 is defined by ring gear 44 of first gearset 24 and ring gear 60 of second planetary gearset 26 being connected together to rotate as a unitary component. Third planetary gearset 28 is shown to include a sun gear 68, a ring gear 70, and pinion gears 72 in meshed engagement with both sun gear 68 and ring gear 70. Pinion gears 72 are rotatably supported on shafts 74 extending between components of a carrier assembly 76. In addition, sun gear 68 is shown to be held stationary due to its direct connection to a stationary housing portion 78 of transmission 14.

With continued reference to FIG. 1, ring gear 70 is shown to be continually drivingly connected to engine 12 through input shaft 18. The output of planetary gear arrangement 20 is ring gear assembly 66 which is continually drivingly connected to final drive unit 16 through output shaft 22. Torque transmitting mechanism 30 is operably arranged to control selective engagement of carrier assembly 76 with sun gear 42. Likewise, torque transmitting mechanism 32 is operably disposed to control selective engagement of carrier assembly 76 with sun gear 58. In addition, torque transmitting mechanism 34 is operably disposed between ring gear 70 and common carrier assembly 46. Torque transmitting mechanism 38 is operably disposed to selectively control braking of common carrier assembly 46 and, as will be detailed, is further arranged to act as the low/reverse starting or "launch" clutch for automatic transmission 14. Finally, torque transmitting mechanism 40 is operably disposed to control selective braking of sun gear 58 and carrier assembly 76.

Figure 2:
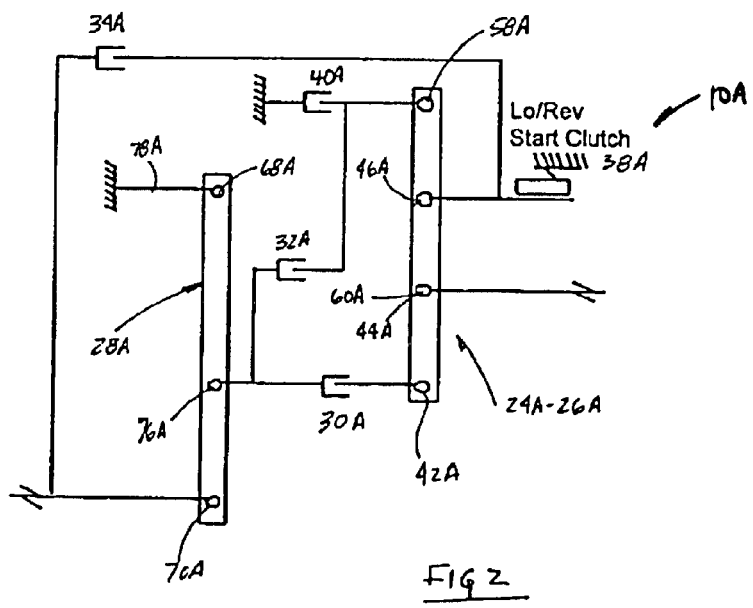
FIG. 2 is a lever diagram of the planetary gear arrangement shown in FIG. 1.

Referring to FIG. 2, a lever diagram 10A is shown which depicts powertrain 10 in a modified form. The corresponding numbers of lever diagram 10A will be given the same numeric designation as the components of powertrain 10 with an "A" suffix. For example, lever arm 28A represents planetary gearset 28 and node 68A represents sun gear 68. Planetary gearsets 24 and 26 are combined as a single lever with the designation 24A–26A. Portion 24A consists of nodes 42A, 44A and 46A while the portion 26A consists of nodes 58A, 60A and 46B.

During operation of transmission 14, a neutral condition is established by disengaging all of the torque transmitting mechanisms. To establish the reverse drive ratio, torque transmitting mechanism 32 is fully engaged and torque transmitting mechanism 38 is engaged under controlled conditions dependent on signals received by the ECU. To provide a controlled launch, torque transmitting mechanism 32 is fully engaged prior to initiation of engagement of torque transmitting mechanism 38. Thus, torque transmitting mechanism 38 is the launch device for the reverse drive ratio. Controlled engagement of torque transmitting mechanism 38 results in controlled launch or acceleration of the vehicle in which powertrain 10 is installed. This ratio is referred to as the reverse launch ratio.

To establish the first forward drive ratio from the neutral condition, torque transmitting mechanism 30 is fully engaged and torque transmitting mechanism 38 is engaged under controlled conditions depending on the commands from the vehicle operator, as interpreted by the ECU. The ratio thus established is also designated as the forward launch ratio. To provide a controlled launch, torque transmitting mechanism 30 is fully engaged prior to initiation of engagement of torque transmitting mechanism 38. Thus, torque transmitting mechanism 38 is the launch device during the first forward drive ratio. As torque transmitting mechanism 38 is engaged, the vehicle will accelerate in a controlled fashion.

To sequentially establish the second forward drive ratio, torque transmitting mechanism 38 is disengaged and torque transmitting mechanism 40 is engaged while torque transmitting mechanism 30 remains engaged. The third forward drive ratio is established by releasing torque transmitting mechanism 40 and engaging torque transmitting mechanism 32 while torque transmitting mechanism 30 remains engaged. The fourth forward drive ratio is established by releasing torque transmitting mechanism 32 and engaging torque transmitting mechanism 34 while maintaining engagement of torque transmitting mechanism 30. The fifth forward drive ratio is established by releasing torque transmitting mechanism 30 and engaging torque transmitting mechanism 32 while maintaining engagement of torque transmitting mechanism 34. Finally, the sixth forward drive ratio is established by releasing torque transmitting mechanism 32 and engaging torque transmitting mechanism 40 while engagement of torque transmitting mechanism 34 is maintained. The sequence of controlled engagement and release of the various torque transmitting devices is shown in FIG. 3.

Figure 4:
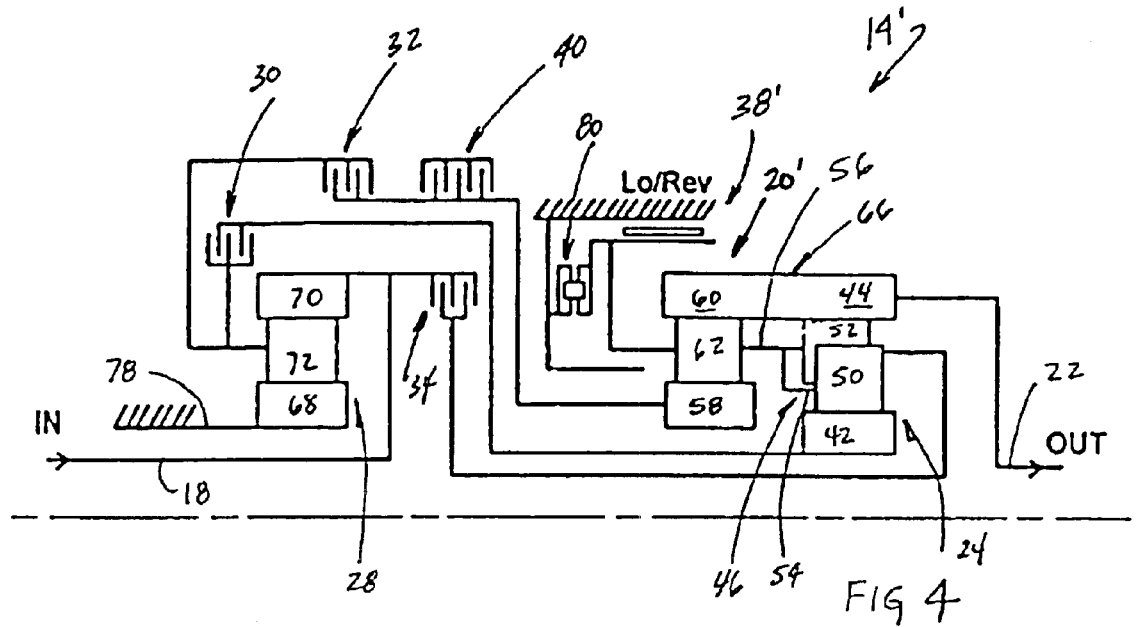
FIG. 4 is a schematic representation of an alternative embodiment of the multi-speed planetary gear arrangement shown in FIG. 1.
Figure 5:
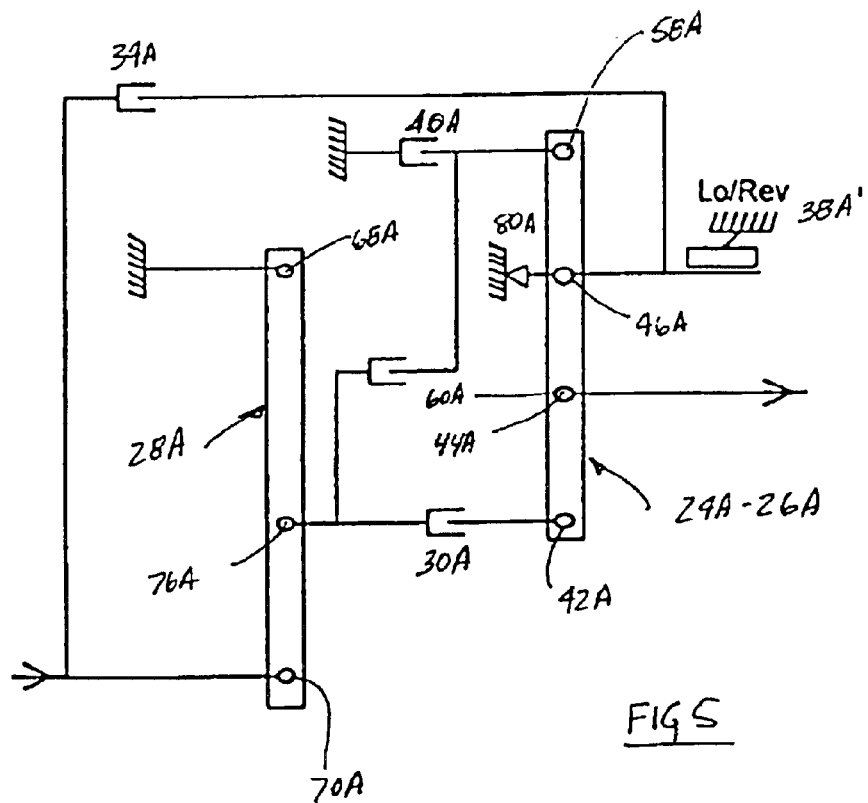
FIG. 5 is a lever diagram for the planetary gear arrangement shown in FIG. 4.

With reference now to FIGS. 4 and 5, a modified version of planetary gear arrangements 20 is shown and identified by reference number 20'. In addition, due to the similarities of many components, like reference numerals are used to identify components of planetary gear arrangement 20' that are similar to those of planetary gear arrangement 20. FIG. 4 schematically illustrates a compact six-speed transmission 14' that is well-suited for use in high torque capacity applications. Transmission 14' includes five clutching elements (six with 1–2 overrunning clutch "OWC" added) and three planes of gears. Two of the planes of gears are incorporated into common carrier 46 for compact packaging. In order to handle high-torque capacity applications, the combined gearset uses long ring gear assembly 66 to bridge the two planes of planetary pinions. This long ring gearset has better scalability for high torque applications compared to conventional long pinion ravigneaux arrangements. By using this arrangement with the common carrier and long ring gearset, a family of six-speed automatic transmissions can be developed with varying torque capacities. A significant advantage relates to the ability to commonize many transmission designs using similar and/or the same components.

Referring again to FIG. 4, planetary gear arrangement 20' is shown to include a modified low/reverse starting clutch, now identified by reference numeral 38'. In particular, torque transmitting mechanism 38' utilizes a band-type brake assembly in place of the multi-plate arrangement shown in FIG. 1. In addition, an OWC 80 is shown operably installed between stationary housing 78 and common carrier assembly 46. The lever diagram of FIG. 5 is generally similar to that of FIG. 2 with the exception that OWC 80 has been included. Furthermore, FIG. 6 is a truth table chart describing the gear ratios and torque transmitting mechanism engagement schedule for planetary gear arrangement 20'.

Figure 7:
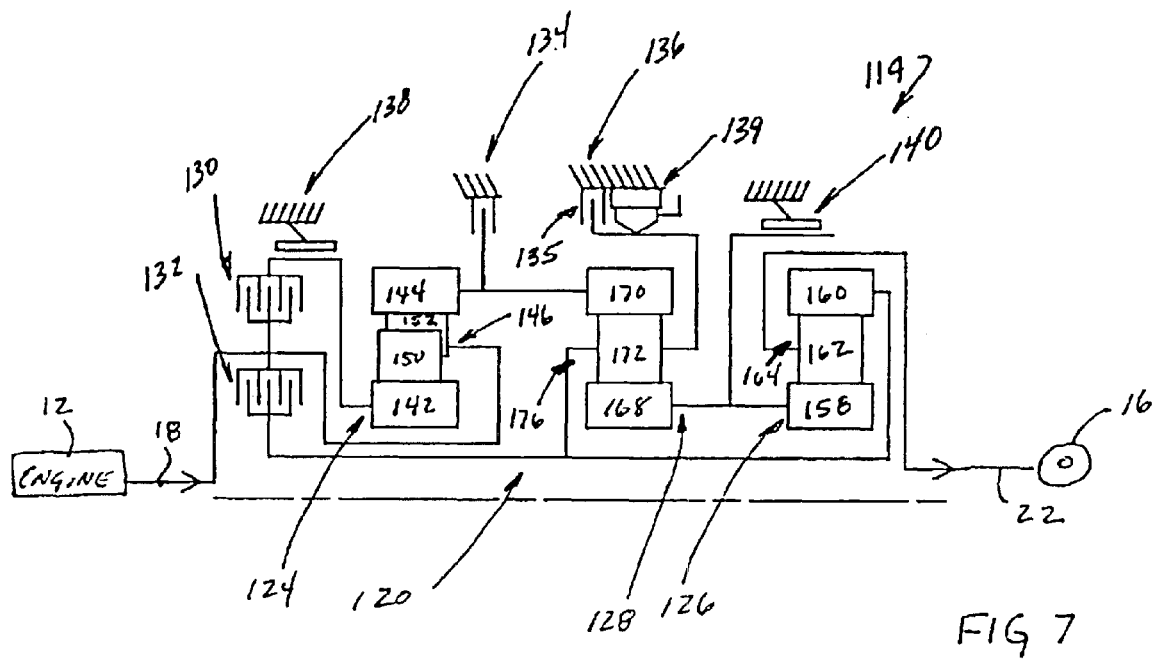
FIGS. 7 and 8 are schematic stick and lever diagrams for a multi-speed gear arrangement in a power transmission according to another alternative embodiment of the present invention.
Figure 8:
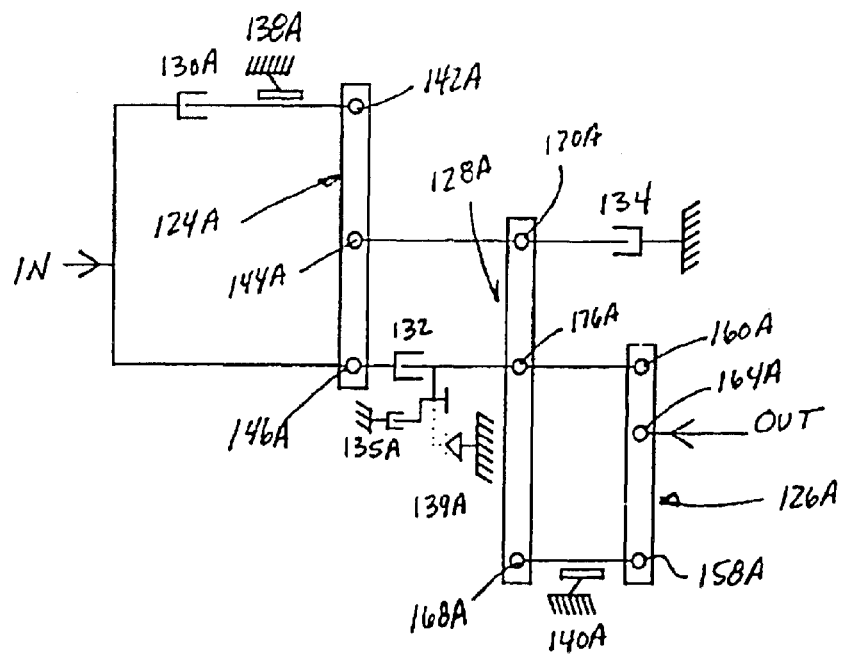

Referring now to FIGS. 7 and 8, corresponding schematic stick and lever diagrams are provided to illustrate another embodiment of the present invention. In particular, transmission 114 includes a planetary gear arrangement 120 which uses a low torque/high-speed grounded ratio changing torque transmission mechanism as the starting clutch for both forward and reverse launch. Planetary arrangement 120 includes a compound planetary gearset 124, two simple planetary gearsets 126 and 128, two selectively engageable rotating torque transmitting mechanisms 130 and 132, and four selectively engageable stationary torque transmitting mechanisms 134, 136, 138 and 140.

Rotating torque transmitting mechanisms 130 and 132 are conventional fluid-operated multi-plate clutch assemblies. Stationary torque transmitting mechanisms 134 and 136 are conventional fluid-operated brake assemblies of either friction plate type or band plate type. In addition, stationary torque transmitting mechanisms 138 and 140 are preferably a band-type brake assembly. As previously noted, the torque transmitting mechanisms are shifted between engaged and disengaged states by a conventional electro-hydraulic mechanism controlled by an ECU that incorporates a conventional programmable digital computer.

First planetary 124 is shown to include a sun gear 142, a ring gear 144, and a planet carrier assembly 146. Meshed pairs of pinion gears 150 and 152 are rotatably supported on pinion shafts that extend between laterally-spaced carrier segments of carrier assembly 146. Pinion gears 150 mesh with sun gear 142 while pinion gears 152 mesh with ring gear 144. Second planetary gearset 126 includes a sun gear 158, a ring gear 160, and a plurality of pinion gears 162 that are meshed with both sun gear 158 and ring gear 160. Pinion gears 162 are rotatably supported on pinion shafts that extend between laterally-spaced carrier segments of a carrier assembly 164. Third planetary gearset 128 is shown to include a sun gear 168, a ring gear 170, and pinion gears 172 in meshed engagement with both sun gear 168 and ring gear 170. Pinion gears 172 are rotatably supported on pinion shafts extending between components of a carrier assembly 176.

With continued reference to FIG. 7, sun gear 142 is operatively connected with stationary torque transmitting mechanism 138 and rotating torque transmitting mechanism 130. Ring gear 144 is operatively connected with stationary torque transmitting mechanism 134. When stationary torque transmitting mechanism 138 is selectively engaged, sun gear 142 is held stationary and when torque transmitting mechanism 130 is selectively engaged, sun gear 142 is connected directly with engine through input shaft 18, or with a vibration isolator or damper connected between engine 12 and shaft 18. When torque transmitting mechanism 134 is selectively engaged, ring gear 144 is held stationary. Likewise, ring gear 160 of second planetary gearset 126 is operatively connected with torque transmitting mechanism 132. In addition, sun gear 158 of planetary gearset 126 is continuously connected with sun gear 168 of planetary gearset 128. Both sun gears 158 and 168 are operatively connected with torque transmitting mechanism 140 which, when engaged, will hold sun gears 158 and 168 stationary. When torque transmitting mechanism 132 is engaged, ring gear 160 will rotate in unison with engine 12 through input shaft 18.

Ring gear 170 is shown to be continuously connected with ring gear 144 of first planetary gearset 124 and operatively connected with torque transmitting mechanism 134. Planetary carrier assembly 176 is operatively connected with torque transmitting mechanism 136 and torque transmitting mechanism 132. When torque transmitting mechanism 134 is selectively engaged, both ring gear members 144 and 170 will be held stationary. When torque transmitting mechanism 132 is selectively engaged, planet carrier assembly 176 will rotate in unison with engine 12 through input shaft 18 and also with ring gear 160. When torque transmitting mechanism 136 is selectively engaged, planet carrier assembly 176 and ring gear 160 will be held stationary. As seen, torque transmitting mechanism 136 is a combination multi-plate clutch assembly 135 and a controllable overrunning clutch 139, arranged in parallel, both of which are operable for selectively braking rotation of planet carrier 176.

During operation of the transmission, a neutral condition is established by disengaging all of the torque transmitting mechanisms. To establish the reverse drive ratio, torque transmitting mechanism 136 is fully engaged and torque transmitting mechanism 138 is engaged under controlled conditions dependent on signals received by the ECU. To provide a controlled launch, torque transmitting mechanism 136 is fully engaged prior to initiation of engagement of torque transmitting mechanism 138. Thus, torque transmitting mechanism 138 is a launch device for the reverse drive ratio. Controlled engagement of torque transmitting mechanism 138 results in controlled launch or acceleration of the vehicle in which the powertrain is installed. In a like manner, to establish the first forward drive ratio from the neutral condition, torque transmitting mechanism 140 is fully engaged and torque transmitting mechanism 138 is engaged under controlled conditions depending on commands from the vehicle operator, as interpreted by the ECU. The ratio thus establishes also designated as the forward launch ratio. To provide a controlled launch, torque transmitting mechanism 140 is fully engaged prior to initiation of engagement of torque transmitting mechanism 138 during the first forward drive ratio.

To establish the second forward ratio, torque transmitting mechanism 138 is disengaged and torque transmitting mechanism 130 is engaged while torque transmitting mechanism 140 remains engaged. The third forward drive ratio is established by releasing torque transmitting mechanism 130 and engaging torque transmitting mechanism 132. This completes a ratio interchange from the second forward ratio to the third forward ratio. To establish the fourth forward drive ratio, during a ratio interchange from third to fourth, torque transmitting mechanism 140 is disengaged and torque transmitting mechanism 130 is engaged while torque transmitting mechanism 132 remains engaged. To establish the fifth forward drive ratio, with an interchange from the fourth forward drive ratio, torque transmitting mechanism 130 is disengaged and torque transmitting mechanism 138 is engaged while torque transmitting mechanism 132 remains engaged. Finally, the sixth and (highest) forward drive ratio with an interchange from the fifth forward drive ratio is established by disengaging torque transmitting mechanism 138 while engaging torque transmitting mechanism 134 while torque transmitting mechanism 132 remains engaged.

Figure 9:
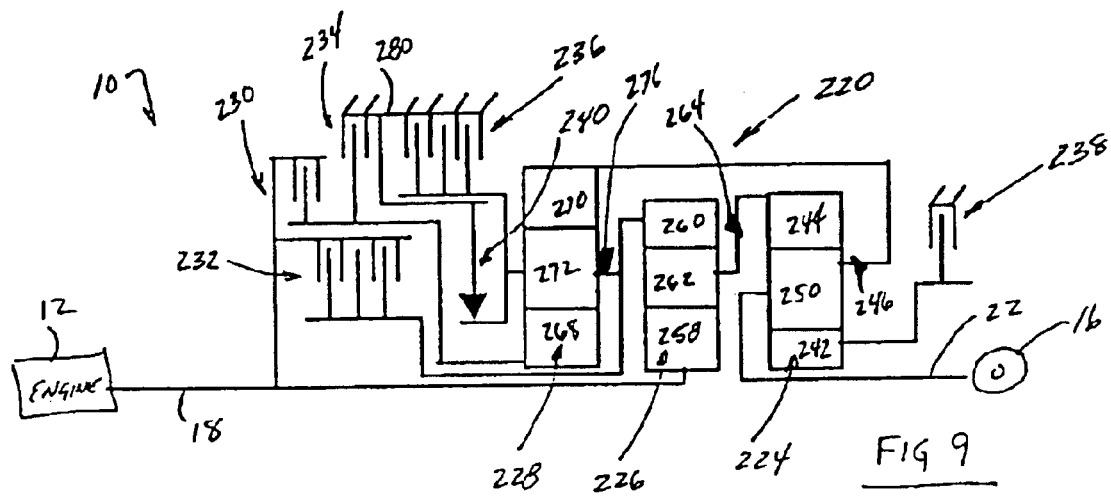
FIGS. 9 and 10 are schematic stick and lever diagrams for a multi-speed gear arrangement in a power transmission according to another alternative embodiment of the present invention.
Figure 10:
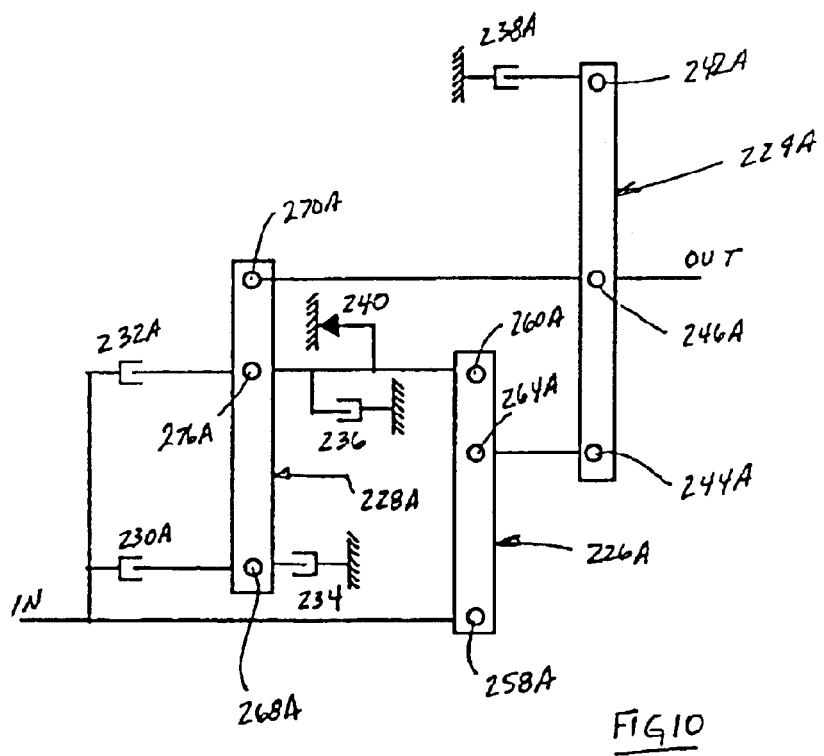

Referring now to FIGS. 9 and 10, a planetary gear arrangement 220 is disclosed for use in powertrain 10 which uses two separate grounding clutches to launch. That is, one grounding clutch is used for the forward launch and the other clutch is used for the reverse launch. Planetary gear arrangement 220 includes three simple planetary gearsets 224, 226 and 228, two rotating torque transmitting mechanisms 230 and 232, three stationary grounding-type torque transmitting mechanisms 234, 236 and 238, and a free-wheeling OWC 240. Planetary gearset 224 is shown to include a sun gear 242, a ring gear 244, and pinions 250 meshed therewith. Pinions 250 are rotatably supported on pinion shafts which are connected to laterally-spaced carrier components of a planet carrier assembly 246. Likewise, second planetary gearset 226 includes a sun gear 258, a ring gear 260, and pinion gears 262 meshed therewith. Pinions 262 are rotatably supported on pinions shafts which extend between laterally-spaced components of a planet carrier assembly 264. As seen, carrier assembly 264 is shown to be directly connected to ring gear 244 of planetary gearset 224. Third planetary gearset 228 includes a sun gear 268, a ring gear 270, and pinions gears 272 meshed therewith. Pinion gears 272 are rotatably supported on pinion shafts which extend between laterally-spaced carrier components of planet carrier assembly 276. As is also seen, carrier assembly 276 is directly connected for rotation with ring gear 260 of planetary gearset 226 and carrier assembly 246 is directly connected for rotation with ring gear 270.

Torque transmitting mechanism 230 is operably disposed for selectively coupling sun gear 268 for rotation with input shaft 18. In addition, torque transmitting mechanism 232 is operably arranged for selectively coupling ring gear 260 of planetary gearset 226 and carrier assembly 276 of planetary gearset 228 for rotation with input shaft 18. Torque transmitting mechanism 234 is operably arranged for selectively coupling sun gear 268 with stationary housing segment 280, thereby braking rotation of sun gear 268. Torque transmitting mechanism 236 is operably arranged between stationary housing 280 and planet carrier assembly 276 for selectively braking rotation of planetary carrier 276. Free-wheeling overrunning clutch 240 is arranged to allow for a 1–2 shift and is disposed between housing 280 and planetary carrier 276 in parallel with torque transmitting mechanism 236. Torque transmitting mechanism 238 is operably disposed for selectively braking rotation of sun gear 242. As is similar to all of the previous lever diagrams, FIG. 10 depicts gear arrangement 220 shown in FIG. 9 in alternative mode.

FIG. 11 is a chart illustrating the shift schedule for the various torque transmitting mechanisms associated with planetary gear assembly 220 required to establish the various forward and reverse gear ratio drive connections. In this embodiment, torque transmitting mechanism 236 is used to launch in reverse and torque transmitting mechanism 238 is used to launch forward. Alternatively, torque transmitting mechanism 236 could be used by itself as the starting clutch for both forward and reverse launch.

Figure 13:
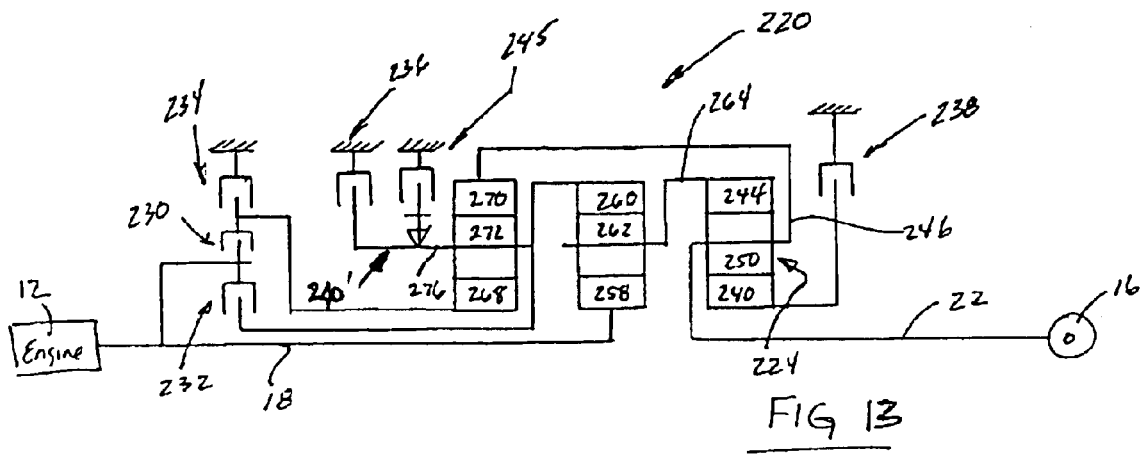
FIGS. 12 and 13 are further alternative versions of a planetary gear arrangement according to the present invention.
Figure 12:
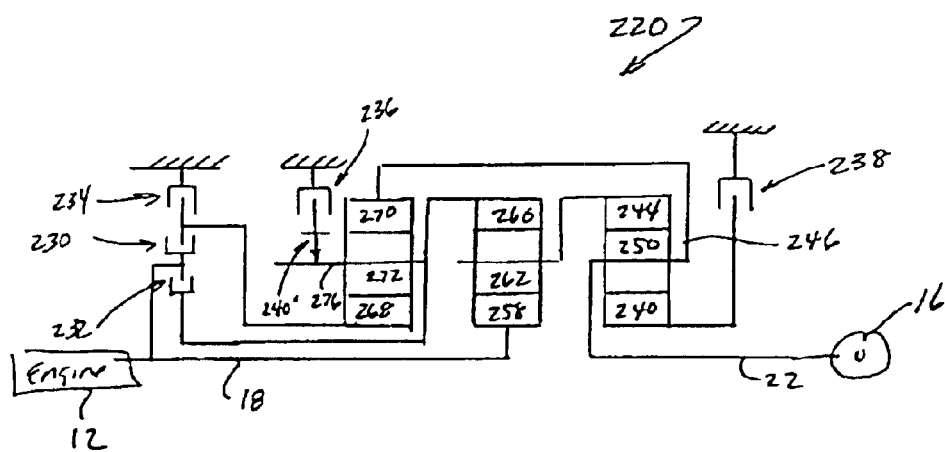

Referring to FIG. 12, a modified version of the planetary gear assembly shown in FIG. 9 is described as having a selectively engageable OWC (torque transmitting mechanism 240') in series with the friction launch low/reverse clutch (torque transmitting mechanisms 236) instead of being arranged in parallel. This allows use of a one-way clutch for the 1–2 shift and a single clutch for friction launch in both first and reverse gears. In particular, when the reverse gear is established, the grounding torque from torque transmitting mechanisms 236 is transferred through the engaged torque transmitting mechanism 240' as if a direct connect was established in both directions. In first gear launch, the first gear grounding torque is through the selective OWC 240' as if it was a one-way clutch commonly used in conventional automatic transmissions. However, the reverse direction of torque capacity for OWC 240' must be disabled before a 1–2 shift and after reverse or low braking grounding torque is needed. OWC 240' acts as a one-way clutch during the 1–2 and 2–1 shifts, thereby providing improved shifts than could be obtained in a clutch-clutch system. Moreover, in first gear coast, OWC 240' may be enabled in the reverse ground direction to provide ground for coast braking if desired. Selective actuation or disablement of OWC 240' can be controlled via any suitable type of actuation system, with hydraulic controls being preferred. As seen in FIG. 13, a slight modification of FIG. 12 is now shown which locates overrunning clutch 240 in series with an additional grounding clutch-type torque transmitting mechanism 245 for use in forward launch. The arrangement in FIG. 12 is preferably from a packaging standpoint but further requires the use of a selectively controllable overrunning clutch.

One device of particular application to the selective overrunning clutch disclosed for use in FIG. 12 is a controllable bi-directional one-way clutch. While bi-directional one-way clutches are generally known, a need exists for a one-way clutch which is selectable while both inner and outer members are rotating. Prior speed differential, centrifugal force, electro-mechanical, electro-magnetic, and friction clutches are not sufficiently controllable within the operating ranges in an automatic transmission. Specifically, electro-mechanical or electro-magnetic devices are not currently present in an automatic transmission and would require separate control systems. Controlling a one-way clutch via a friction brake hub when the power transmission elements are in series requires a non-functional positioning of the brake hub. Conversely, hydraulic power is currently available in an automatic transmission and is a method to discretely control a one-way clutch within the required ranges of operation.

Figure 14:
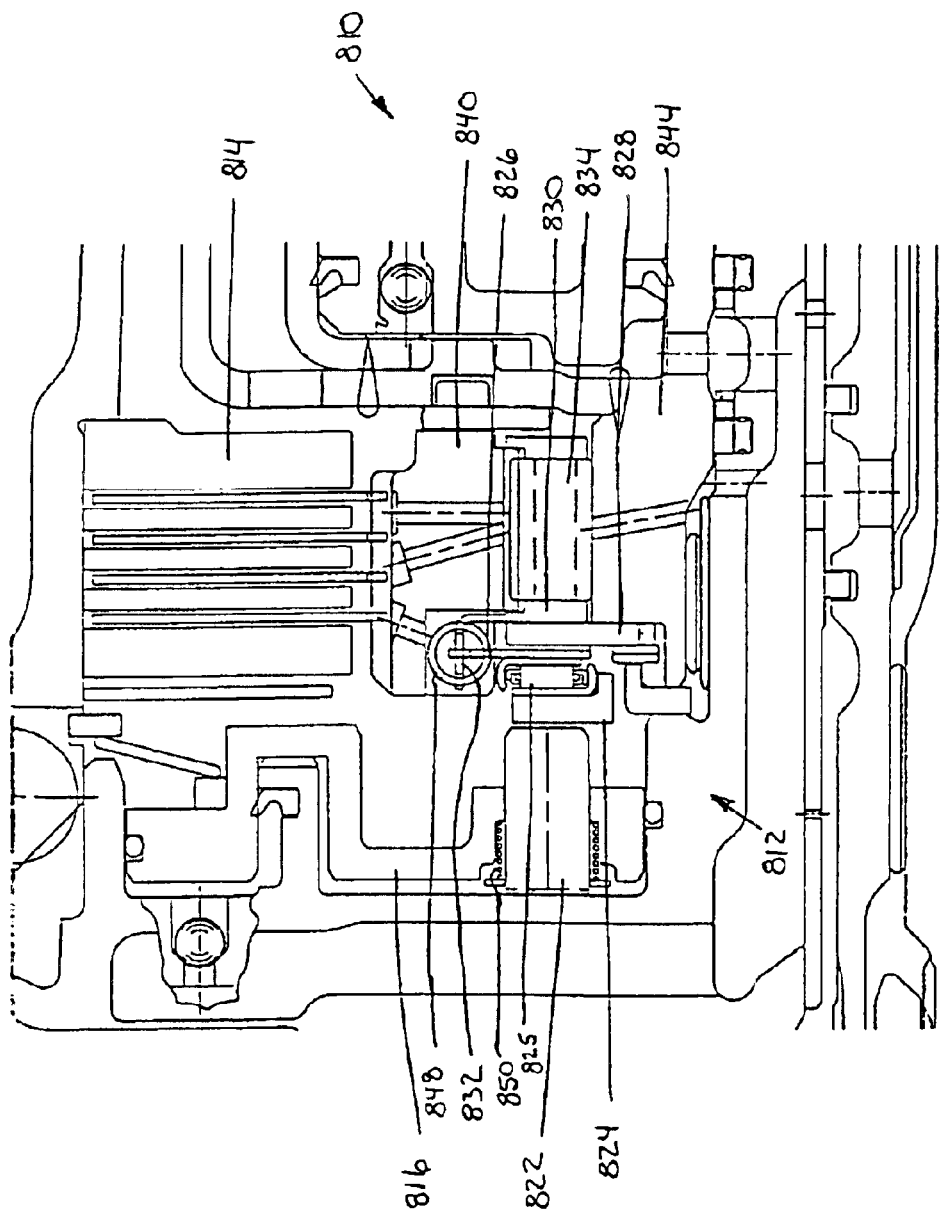
FIGS. 14 through 27 relate to and illustrate various embodiments of selectively controllable bi-directional clutches which find particular application in the transmissions of the present invention.
Figure 15:
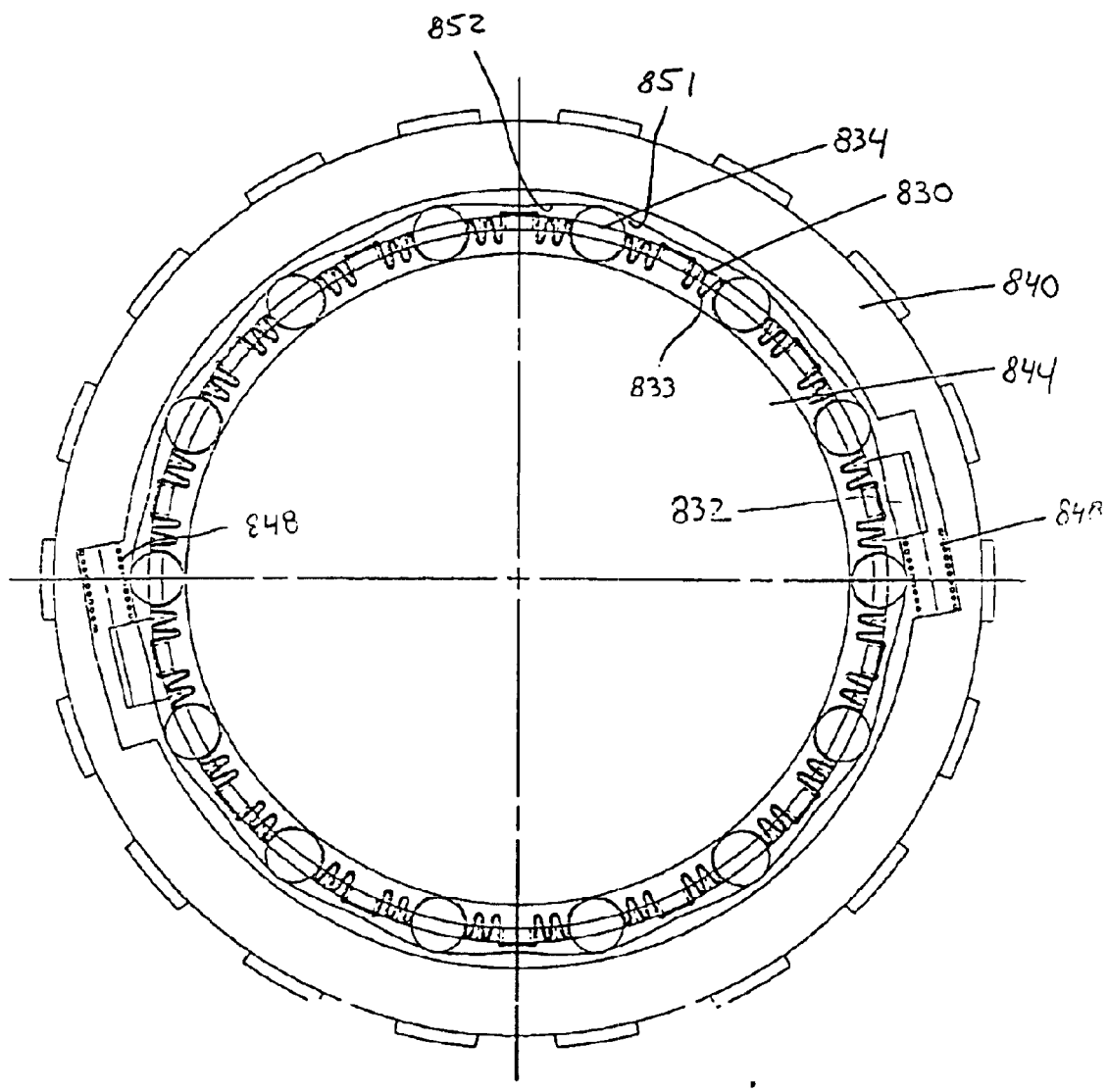
Figure 16:
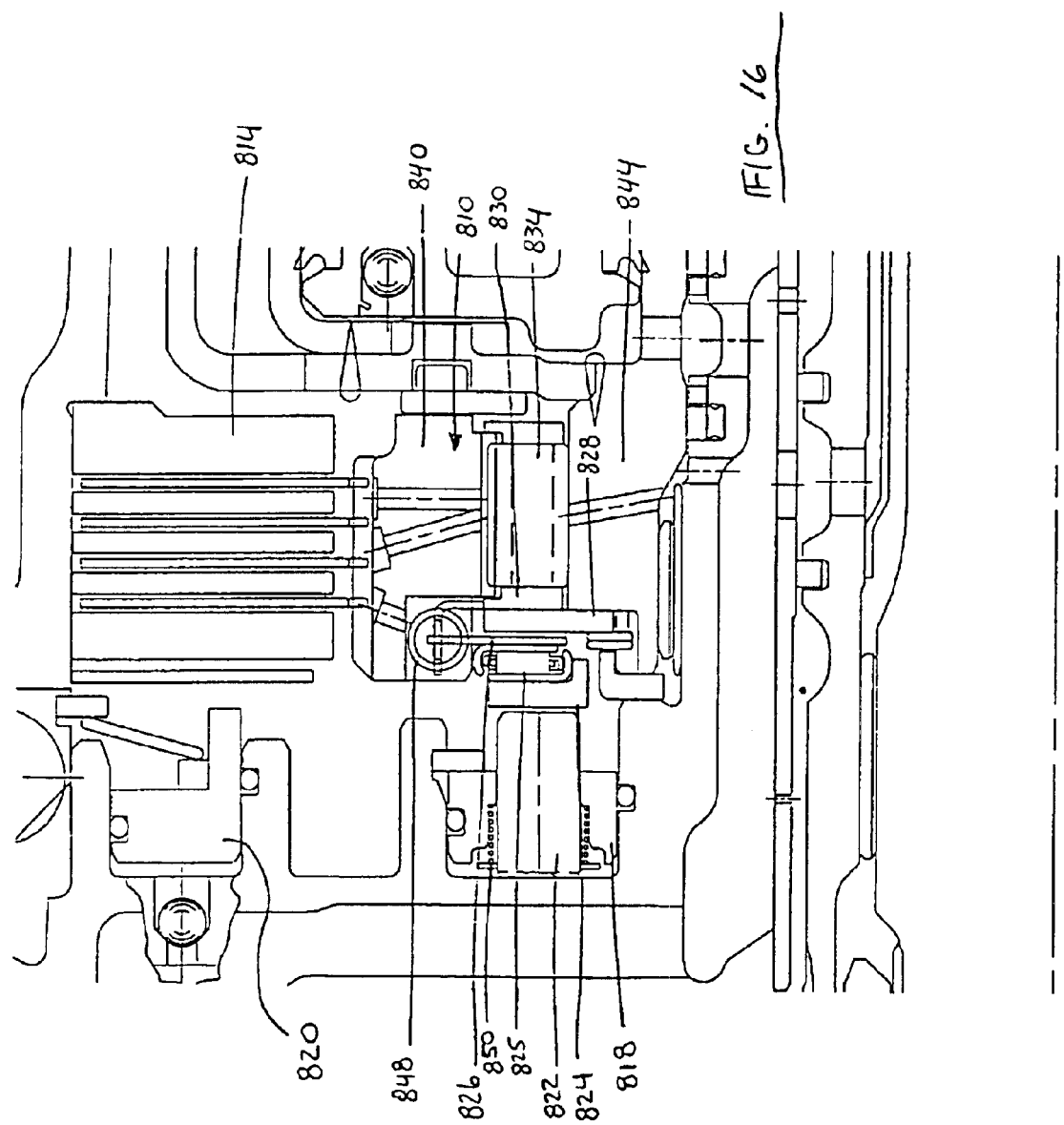

With reference to FIGS. 14 and 15, a clutch assembly 810 includes a bi-directional, one-way clutch 812 and a friction clutch 814 packaged adjacent one another. A dual stage piston 816 is hydraulically actuated by a friction clutch apply oil. While a dual stage piston 816 is represented in FIGS. 14 and 15, one skilled in the art will appreciate that clutch assembly 810 may include a one-way clutch piston 818 and a friction clutch piston 820 operating independently from one another as depicted in FIG. 16.

Dual stage piston 816 includes a plurality of sub-pistons 822 housed within a perimeter portion of dual stage piston 816. Sub-pistons 822 may be selectively hydraulically actuated to place one-way clutch 818 in one of a locked mode or an unlocked mode. FIGS. 14 and 15 depict one-way clutch 812 in the unlocked mode where sub-pistons 822 are not acted upon by hydraulic pressure. One-way clutch 812 also includes an apply piston 824, a thrust bearing 825, a clutch plate 826, a reaction plate 828 and a selection cage 830. Selection cage 830 includes a pair of dogs 832 in communication with clutch plate 826. A plurality of torque carrying elements 834 are generally cylindrically shaped members spaced apart from one another. Selection cage 830 includes a serpentine support web 833 having a plurality of pockets formed therein to retain each of torque carrying elements 834 in a desired spaced relationship. An outer race 840 houses clutch plate 826 and selection cage 830. Outer race 840 is drivingly engaged with a first rotating member. An inner race 844 houses reaction plate 828 and is drivingly coupled to a second rotating member. A cage spring 848 is positioned between each dog 832 and clutch plate 826 to place one-way clutch 812 in the unlocked mode. A plurality of pistons springs 850 interconnect sub-pistons 822 and dual stage piston 816 to return sub-pistons 822 to a position disengaged from apply piston 826. In the unlocked mode, torque carrying elements 834 are positioned within detents 851 of outer race 840. Accordingly, outer race 840 and inner race 844 are allowed to freely rotate relative to one another. When one-way clutch 812 is in the locked mode, torque carrying elements 834 are forced to engage outer race 840 and inner race 844 such that outer race 840 and inner race 844 rotate in the same direction at the same speed.

To actuate one-way clutch 812 from the unlocked mode to the locked mode, hydraulic pressure is applied to sub-pistons 822. Each sub-piston 822 axially translates to contact apply piston 824. Apply piston 824 axially translates to bring clutch plate 826 into contact with reaction plate 828. Clutch plate 826 includes a friction surface such that upon contact with rotating reaction plate 828, clutch plate 826 rotates. Rotation of clutch plate 826 drives selection cage 830 to rotate in opposition to cage springs 848. As selection cage 830 rotates, torque carrying elements 834 are forced to leave detents 851 and follow a contour 852 formed on outer race 840. As torque carrying elements 834 travel along contour 852, the torque carrying elements are forced to engage both outer race 840 and inner race 844. As such, torque is transmitted between the races resulting in both races rotating in the same direction at the same speed.

To switch one-way clutch 812 from the locked mode to the unlocked mode, hydraulic pressure is released from sub-pistons 822. Piston springs 850 disengage sub-pistons 822 from apply piston 824. The torque generating frictional interface between clutch plate 826 and 828 is also released. Cage springs 848 rotate selection cage 830 to reposition torque carrying elements 834 within detents 851. Once torque carrying elements 834 are positioned within the detents, torque is no longer transferred between outer race 840 and inner race 844.

Figure 17:
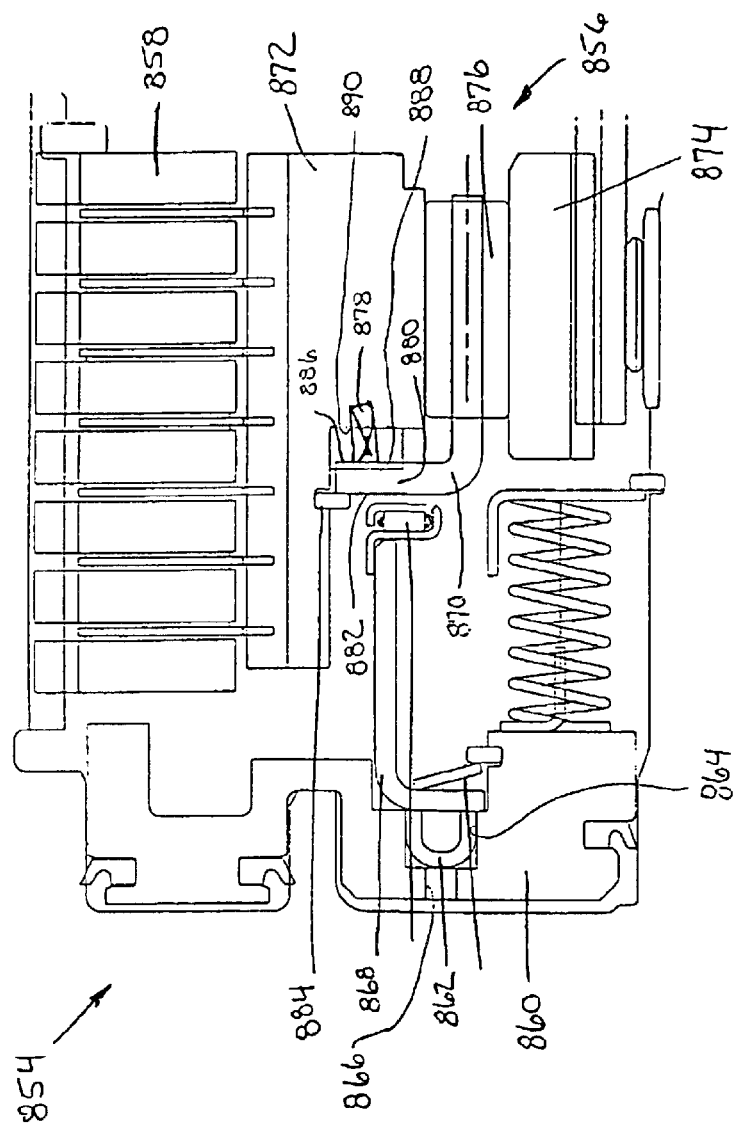
Figure 18:
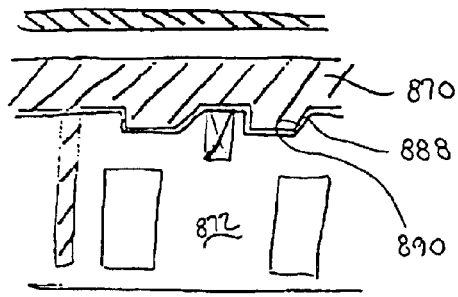
Figure 19:
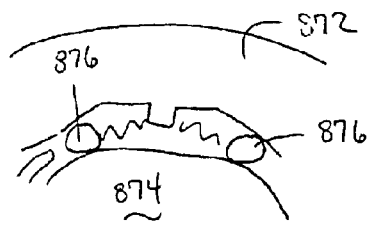

With reference to FIGS. 17 through 19, an alternative clutch assembly 854 is depicted. Clutch assembly 854 includes a one-way clutch 856 and a friction clutch 858. A dual stage piston 860 is actuated by a friction clutch apply oil which provides the desired force for positioning one-way clutch 856 in one of a locked mode or unlocked mode. In similar fashion to clutch assembly 810 previously described, independent pistons (not shown) may be used in lieu of dual stage piston 860. A plurality of sub-pistons 862 are positioned within a plurality of recesses 864 extending into dual stage piston 860. A plurality of ports 866 are in communication with recesses 864 to allow pressurized hydraulic fluid to act on sub-pistons 862. One-way clutch 856 includes an apply piston 868, a cage 870, an outer race 872, an inner race 874 and torque carrying elements 876. As opposed to using frictional plate elements to actuate one-way clutch 812, one-way clutch 856 is actuated using a camming action. A set of cams described hereinafter convert axial motion of apply piston 868 to rotational movement of cage 870.

Figure 21:
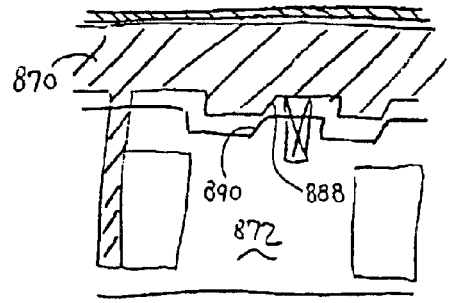
Figure 22:
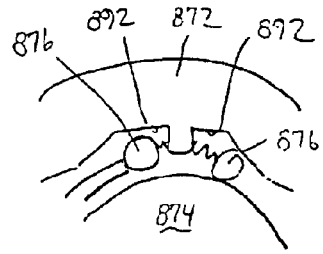
Figure 20:
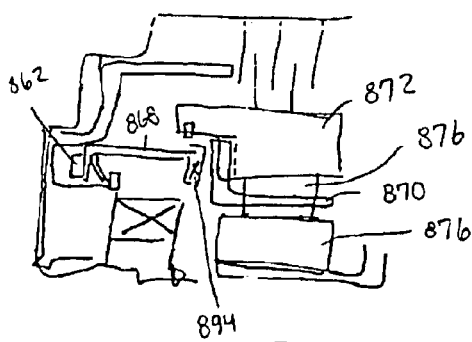
Figure 23:
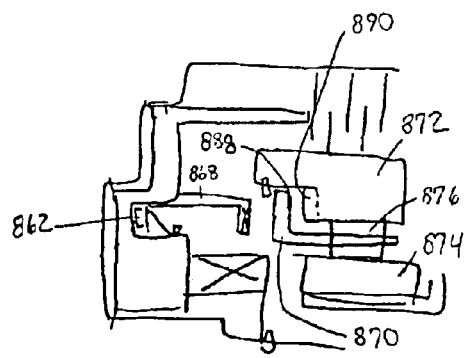
Figure 24:
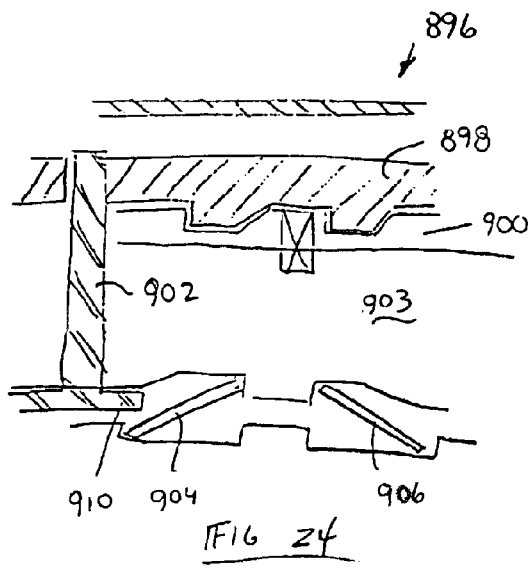
Figure 26:
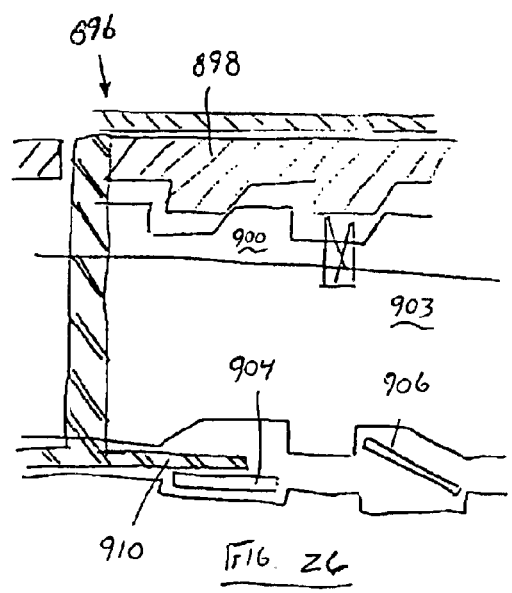
Figure 25:
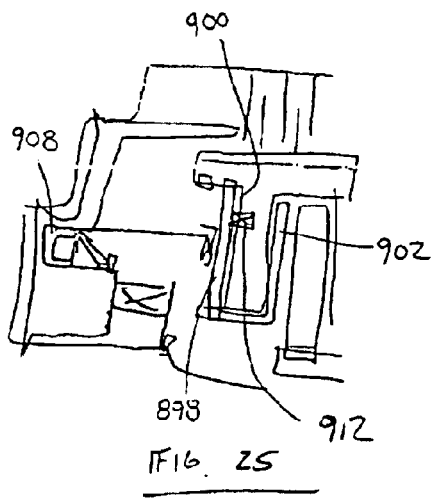
Figure 27:
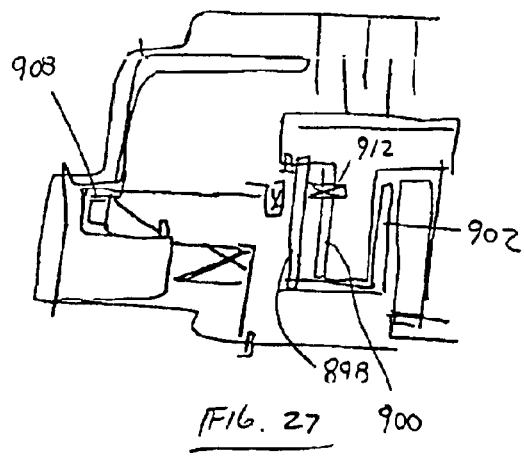

A spring 878 is positioned to act upon outer race 872 and return cage 870 to an initial position depicted in FIG. 17. Cage 870 includes a flange 880 having an outer surface 882 in contact with a retainer 884. As best shown in FIGS. 18 and 21, an inner surface 886 of cage 870 includes a driven cam face 888 positioned thereon. Outer race 872 includes a driving cam face 890 positioned proximate driven cam face 888. FIGS. 18 through 20 depict one-way clutch 856 in the locked mode. FIGS. 21 through 23 depict one-way clutch 856 in the unlocked mode. As mentioned earlier, as long as hydraulic pressure is not supplied to sub-pistons 862, spring 878 maintains clearance between driven cam face 888 and driving cam face 890 as shown in FIG. 21. A spring 891 returns apply piston 868 and sub-pistons 862 to their initial positions. At this time, cage 870 is positioned to maintain the location of torque carrying element 876 within detents 892. Accordingly, outer race 872 may rotate independently of inner race 874.

To operate one-way clutch 856 in the locked mode, hydraulic fluid axially displaces sub-pistons 862 to further axially displace apply piston 868. Apply piston 868 axially moves a thrust washer 894 into contact with flange 880 of cage 870. The axial displacement force from hydraulic acting on sub-pistons 862 is sufficient to overcome spring 878 thereby engaging driven cam face 888 with driving cam face 890. Due to the angle of the respective cam faces, axial movement is converted to rotational movement of cage 870. Rotation of cage 870 causes torque carrying elements 876 to be moved from detents 892 into engagement with both outer race 872 and inner race 874. One-way clutch 856 is now in the locked mode drivingly interconnecting outer race 872 with inner race 874.

It should be appreciated that the bi-directional one-way clutch may be a roller, a diode, a sprag, or a pawl-type one-way clutch. For example, a diode type one-way clutch 898 is illustrated in FIGS. 24 through 27. One-way clutch 896 includes an apply plate 898, a reaction plate 900, a selector plate 902, a diode 903, a first sprag 904 and second sprag 906. To change the mode of operation of diode clutch 896 from a locked to an unlocked mode or vice versa, hydraulic pressure is supplied to a plurality of sub-pistons 908 to axially displace apply plate 898 toward reaction plate 900. In similar fashion to that earlier described, each of apply plate 898 and reaction plate 900 include selectively engageable cam faces. Selector plate 902 rotates upon engagement and disengagement of the cam faces. Selector plate 902 includes a tab 910. Tab 910 is selectively rotated into contact with first sprag 904 to place diode clutch 896 in the desired locked or unlocked mode. Diode clutch 896 is switched to the opposite mode by simply releasing pressure from sub-pistons 908. A spring 912 disengages apply plate 898 from reaction plate 900 thereby disengaging the respective cam faces. At this time, selector plate 902 rotates to its initial position.

What is claimed is:

1. A power transmission for use in a powertrain having an engine for providing rotary power in a first direction to said power transmission, said power transmission comprising:
   an input shaft continuously connected with the engine for rotation therewith;
   an output shaft;
   a first planetary gearset having a plurality of planetary gear members, said first planetary gearset being continuously connected with said input shaft;
   a second planetary gearset having a plurality of planetary gear members, said second planetary gearset being drivingly interconnected with said output shaft;
   a third planetary gearset having a plurality of planetary gear members, said third planetary gearset being drivingly interconnected with said output shaft;
   a first torque transmitting mechanism selectively operable to engage said first planetary gearset with said second planetary gearset to provide a forward drive ratio;
   a second torque transmitting mechanism selectively operable to engage said first planetary gearset with said third planetary gearset to provide a reverse drive ratio; and
   a third torque transmitting mechanism for selectively braking rotation of at least one of said planetary gear members of said second planetary gearset and said third planetary gearset to serve as a reaction member in both said forward drive ratio and said reverse drive ratio.

2. The power transmission according to claim 1, further comprising:
   a fourth torque transmitting mechanism selectively operable to engage said second planetary gearset for rotation with said input shaft; and
   a fifth torque transmitting mechanism for selectively braking rotation of said third planetary gearset.

3. The power transmission according to claim 1 wherein said third torque transmitting mechanism is a multi-plate clutch mechanism.

4. The power transmission according to claim 1 wherein said third torque transmitting mechanism is a band-type brake assembly.

5. The power transmission according to claim 1 wherein said first planetary gearset, said second planetary gearset, and said third planetary gearset each includes a first member, a second member, and a third member.

6. The power transmission according to claim 5 wherein said second member of said second planetary gearset includes a meshed pair of pinion gears.

7. The power transmission according to claim 5, further comprising a housing, and wherein said third member of said first planetary gearset is fixedly coupled to said housing.

8. The power transmission according to claim 5 wherein said third member of said second planetary gearset and said third member of said third planetary gearset are formed as a single unitary member.

9. The power transmission according to claim 8, wherein said single unitary member is a ring gear.

10. A power transmission for use in a powertrain having an engine for providing rotary power in a first direction to said power transmission, said power transmission comprising:
    an input shaft continuously connected with the engine for rotation therewith;
    an output shaft;
    a first planetary gearset having a plurality of planetary gear members, said first planetary gearset being continuously connected with said input shaft;
    a second planetary gearset having a plurality of planetary gear members, said second planetary gearset being drivingly interconnected with said output shaft;
    a third planetary gearset having a plurality of planetary gear members, said third planetary gearset being drivingly interconnected with said output shaft;
    a first torque transmitting mechanism selectively operable to engage said first planetary gearset with said second planetary gearset to provide a forward drive ratio;
    a second torque transmitting mechanism selectively operable to engage said first planetary gearset with said third planetary gearset to provide a reverse drive ratio;
    a third torque transmitting mechanism for selectively braking rotation of at least one of said planetary gear members of said second planetary gearset and said third planetary gearset to serve as a reaction member in both said forward drive ratio and said reverse drive ratio;
    a fourth torque transmitting mechanism selectively operable to engage said second planetary gearset for rotation with said input shaft; and
    a fifth torque transmitting mechanism for selectively braking rotation of said third planetary gearset.

11. The power transmission according to claim 10 wherein said third torque transmitting mechanism is chosen from the group consisting essentially of a multi-plate clutch mechanism and a band-type brake assembly.

12. A power transmission for use in a powertrain having an engine for providing rotary power in a first direction to said power transmission, said power transmission comprising;
    an input shaft continuously connected with the engine for rotation therewith;
    an output shaft;
    a first planetary gearset having a first member continuously drivingly connected with said input shaft, a second member and a third member;
    a second planetary gearset having a first member drivingly interconnected with said output shaft, a second member and a third member;
    a third planetary gearset having a first member drivingly interconnected with said output shaft;
    a first torque transmitting mechanism selectively operable to engage said second member of said first planetary gearset with said third member of said second planetary gearset to provide a first forward launch ratio;
    a second torque transmitting mechanism selectively operable to engage said second member of said first planetary gearset with said third member of said third planetary gearset to provide a reverse launch ratio; and a third torque transmitting mechanism for selectively braking rotation of at least one of said second member of said second planetary gearset and said second member of said third planetary gearset to serve as a reaction member in both said first forward launch ratio and said reverse launch ratio.

13. The power transmission of claim 12 wherein said first member of said second planetary gearset and said first member of said third planetary gearset are formed as a single unitary member.

14. The power transmission of claim 12 wherein said third member of said first planetary gearset is fixedly coupled to a housing of said power transmission.

15. The power transmission of claim 14 wherein said second member of said second planetary gearset is fixedly coupled to said second member of said third planetary gearset.

16. The power transmission of claim 12 wherein said first torque transmitting mechanism is fully engaged prior to controlled engagement of said third torque transmitting mechanism to establish said first forward launch ratio between said input shaft and said output shaft.

17. The power transmission of claim 16 wherein said second torque transmitting mechanism is fully engaged prior to controlled engagement of said third torque transmitting mechanism to establish said reverse launch ratio between said input shaft and said output shaft.

18. The power transmission of claim 17 further including:
a fourth torque transmitting mechanism selectively operable to engage said second member of said second planetary gearset for rotation with said input shaft; and
a fifth torque transmitting mechanism for selectively braking rotation of said third member of said third planetary gearset.

19. A power transmission for use in a powertrain having an engine for providing rotary power in a first direction to said power transmission, said power transmission comprising;
an input shaft continuously connectable with the engine for rotation therewith;
an output shaft;
a first planetary gearset having a first member operably coupled with said input shaft, a second member and a third member;
a second planetary gearset having a first member drivingly interconnected with said output shaft, a second member and a third member;
a third planetary gearset having a first member drivingly interconnected with said output shaft;
a first torque transmitting mechanism selectively operable to engage said second member of said first planetary gearset with said third member of said second planetary gearset to provide a first forward launch ratio;
a second torque transmitting mechanism selectively operable to engage said second member of said first planetary gearset with said third member of said third planetary gearset to provide a reverse launch ratio; and
a third torque transmitting mechanism for selectively braking rotation of at least one of said second member of said second planetary gearset and said second member of said third planetary gearset to serve as a reaction member in both said first forward launch ratio and said reverse launch ratio, wherein said first torque transmitting mechanism is fully engaged prior to controlled engagement of said third torque transmitting mechanism to establish said first forward launch ratio between said input shaft and said output shaft.

20. The power transmission of claim 19 wherein said second torque transmitting mechanism is fully engaged prior to controlled engagement of said third torque transmitting mechanism to establish said reverse launch ratio between said input shaft and said output shaft.

21. The power transmission of claim 20 further including:
a fourth torque transmitting mechanism selectively operable to engage said second member of said second planetary gearset for rotation with said input shaft; and
a fifth torque transmitting mechanism for selectively braking rotation of said third member of said third planetary gearset.

* * * * *